…

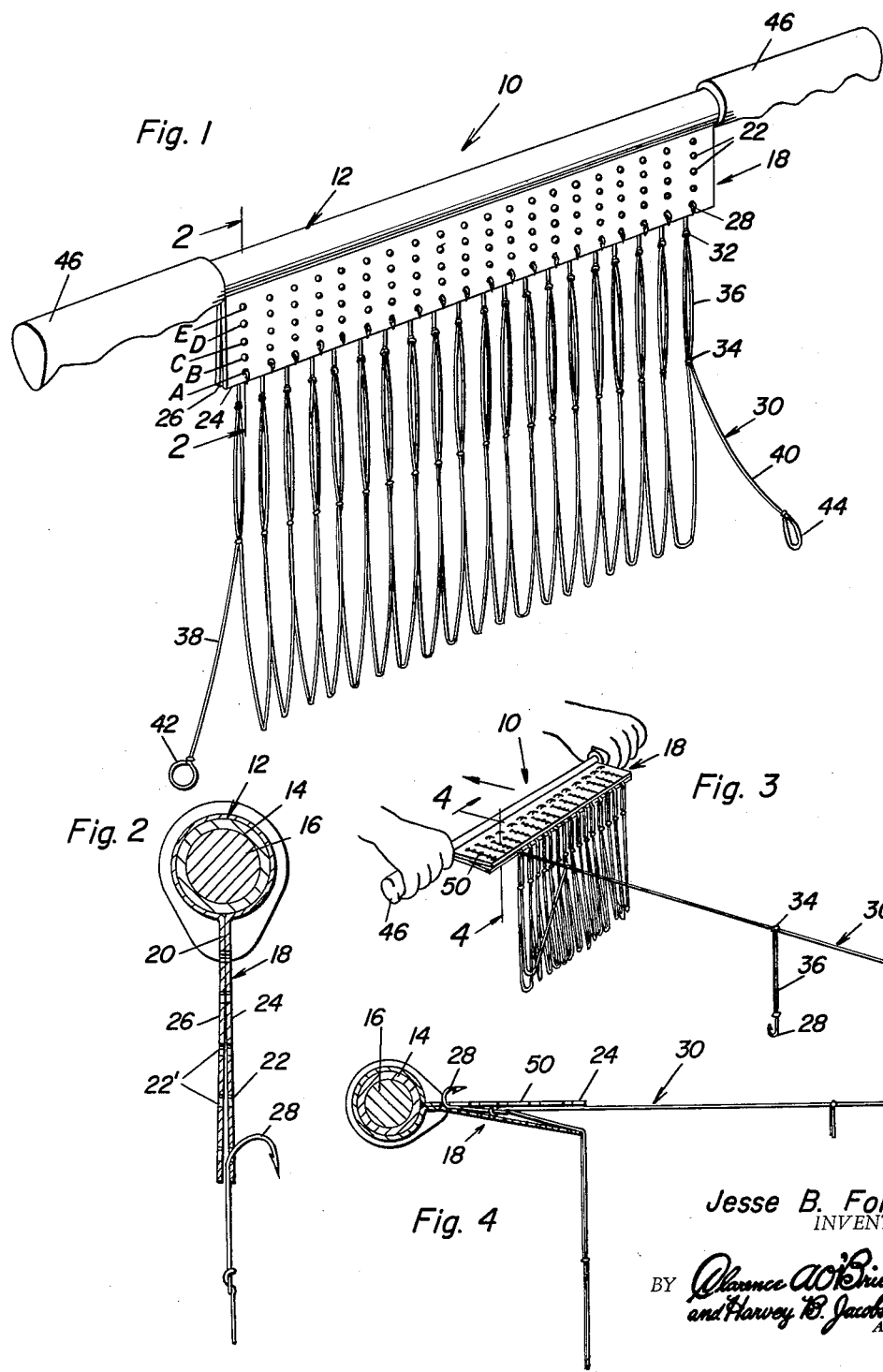

United States Patent Office 3,104,489
Patented Sept. 24, 1963

3,104,489
DISPENSING-TYPE HOLDER FOR TROTLINE
Jesse B. Ford, 6414 Leader, Houston, Tex.
Filed June 27, 1961, Ser. No. 120,078
6 Claims. (Cl. 43—54.5)

This invention relates to fishing devices, and particularly to a device for holding and dispensing a fishing trotline.

Briefly, the invention comprises a strip of pliable material mounted on a handle with the hooks of the trotline supported in a row of apertures in the material. To operate the device, the operator secures one end of the trotline to a fixed object on shore, and holds the dispenser with the trotline thereon while he moves away from shore in a boat. As the boat moves, the hooks of the trotline are rapidly torn away from the supporting pliant or equivalent sheet material and immediately dispensed in the water.

Accordingly, it is the primary object of this invention to provide a new and improved means for supporting and dispensing a trotline.

It is another object of the invention to provide a fishing line dispenser which will accommodate any size hook, even a treble hook, even through treble hooks are not ordinarily used for trotlines.

It is still another object of the invention to provide a fishing line dispenser so designed that it is impossible for any hook on the line to become entangled with another hook, or jump or slip over another hook, while the trotline is being dispensed.

It is another object of the invention to provide a trotline dispenser and holder so designed that the hooks retained thereby are prevented from metal to metal contact at all times thereby preventing any possibility of dulling or damaging the hooks.

It is still another object of the invention to provide a means for holding and dispensing a trotline at tremendously high speeds.

It is yet another object of the invention to provide a means for supporting and dispensing a trotline in such a manner that the hooks on the trotline may be baited while supported by the dispenser.

It is still another object of the invention to provide a trotline holder and dispenser comprising a pliable member mounted on a rigid handle and so designed that the pliable member may be removed from the handle with the trotline thereon and thus permitting the trotline and pliable member to be folded compactly for easy transporting and storing thereof.

It is still another object of the invention to provide a trotline holder which is simple in design, requires a minimum of parts, is composed of inexpensive material, economical to manufacture and is reliable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing the trotline holder and dispenser with a trotline mounted thereon;

FIGURE 2 is a vertical cross sectional view on an enlarged scale taken substantially on the plane of line 2—2 of FIGURE 1;

FIGURE 3 is a perspective on a different scale showing the device of FIGURE 1 in use; and FIGURE 4 is a cross-sectional view on an enlarged scale taken substantially on the plane of line 4—4 in FIGURE 3.

By referring to the drawings, it can be seen that the trotline holder and dispenser 10 comprises a rigid handle 12 which is preferably circular in cross section and comprises a tube 14 with a rod 16 slidable therein. As shown in the drawings, the tube 14 and rod 16 are of the same length and the rod is fully inserted into the tube 14. However, if it is desired to use the handle 12 on a longer trotline holder, the handle may be lengthened by sliding the rod 16 partially out of tube 14 the desired distance.

A pliant holder 18 comprising a rectangular piece of flexible sheet material is symmetrically folded upon itself midway between its ends and then wrapped around the handle 12. The abutting mid-portions of the material are cemented or otherwise suitably joined together adjacent the handle at 20 so as to securely and snugly retain the holder on the tube 14. If desired, other conventional means such as staples or stitching may be used for securing the abutting mid-portion of the holder together. A plurality of hook retaining apertures 22 are provided in each of the flanges 24 and 26 of the holder. These apertures or holes are preferably arranged in series of equally spaced longitudinal rows. For example, as illustrated in FIGURE 1, there are shown five rows, namely rows A, B, C, D and E. In the illustration there are twenty holes in each row, thus making a total of 100 holes. It is desirable to have the number of holes be divisible by five because in some jurisdications it is required by law that trotlines have a certain maximum number of hooks. This number is usually a multiple of five.

There are also an equal number of holes 22' in the flexible flange 26 which are spaced the same and are preferably coaxial with the holes 22. This particular arrangement permits both sets of holes to be punched simultaneously.

When the holder and dispenser 10 is first used, the hooks 28 of a trotline 30 are first consecutively inserted into the outermost row (row A) in either of the flanges 24 or 26. FIGURE 1 illustrates the hooks being arranged in row A of flange 24. It is to be noted that the hooks are spaced along the trotline 30 and tied thereto by means of knots 32. A second knot 34 provides a leader 36 which in operation hangs generally perpendicular to the line as illustrated in FIGURE 3. When the hooks 28 are inserted into the holes of a row, the hooks are arranged side-by-side in the same order as they would be when the line is taut.

By attaching the hook and line to the holder 18 in the manner explained above, the free ends of the lines 38 and 40 hang below the ends of the holder 18. The ends 38 and 40 are preferably terminated in loops 42 and 44.

After the holder 10 is mounted on handle 12, hand-grips 46 of a type similar to that used on bicycle handle bars are slipped over the ends of the handle 12. These hand-grips thus prevent any substantial longitudinal relative movement between the holder 18 and handle 12.

In order to dispense the line 30 within fishing waters, it is only necessary to secure one end of the line 30, such as the end 38. The loop 42 of the end 38 may be secured to some object on the shore, and then the operator boards a boat and holds the device by means of hand-grip 46 in the manner illustrated in FIGURE 3. The boat is then propelled away from shore in the desired direction, and since the end 38 is secured, the line immediately becomes taut and the tension therein causes the hooks 28 to tear out of the material comprising holder 18 in consecutive order from right to left as viewed in FIGURE 1. When the entire line is dispensed and separated from the holder 18, the end 40 of the line 30 may then be secured to some fixed object in the water or on the opposite shore by means of loop 44.

It is to be noted that FIGURE 1 illustrates the holder 18 in a new condition and the manner in which it will be used the first time for dispensing a trotline. In FIGURE 3, it is to be noted that the dispenser has already been used four times and is already in the process of being used a fifth time as the hooks are secured in row E. It is to be noted that material between rows A, B, C and D have been connected by tear lines 50.

After all the rows of one of the flexible flanges 24 and 26 have been used, then the rows in the opposite flange may be used in the same manner. Also, where the line and hooks are unusually heavy or large, the hooks may be simultaneously inserted through both holes 22 and 22′ simultaneously. Also, the spacing between the holes and the thickness of the material may be varied to suit the size and weight of the lines and hooks.

It is preferable that the material comprising holder 18 be vinyl plastic since it is easily torn and unusually good results have been obtained thereby. It is also waterproof and not subject to rotting or wetting. While vinyl plastic has been found to be unusually satisfactory, other flexible materials may be substituted therefor.

Ordinarily during use of the device, it is only necessary to hold the handle 12 by one of the hand-grips 46. This is expedited by holding the handle 12 in relation to the line so that an acute angle is formed between the outer end of the handle and the line 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for holding and dispensing a trotline wherein the trotline is provided with a plurality of spaced fishing hooks, said device comprising a rigid handle, a sheet of material having a median portion thereof looped around said handle and secured thereto and having portions projecting outwardly beyond the handle and providing opposed flanges, said sheet of material being provided with at least one row of spaced apertures, each aperture designed and adapted to receive and retain one of the fishing hooks therethrough, said sheet of material being thin and functioning to permit the trotline to pull the fishing hooks through an edge of the material when the trotline is being dispensed.

2. A device as defined in claim 1 wherein each of said flanges contain a plurality of rows of spaced apertures.

3. A device as defined in claim 2 wherein each aperture in one flange is coaxial with an aperture in an adjacent flange.

4. A device as defined in claim 1 wherein said handle is adjustable in length and is circular in cross section.

5. A device as defined in claim 4 wherein said handle has ends extending beyond said sheet and hand-grips slidable on said ends.

6. A device as defined in claim 2 wherein the number of apertures in each row is equal and divisible by five.

References Cited in the file of this patent
UNITED STATES PATENTS

| | | |
|---|---|---|
| 940,132 | Creasey | Nov. 16, 1909 |
| 2,088,132 | Domecq | July 27, 1937 |
| 2,242,521 | Heiner | May 20, 1941 |
| 2,460,526 | Oliver | Feb. 1, 1949 |
| 2,541,920 | Hammock | Feb. 13, 1951 |
| 2,778,142 | Berry | Jan. 22, 1957 |

FOREIGN PATENTS

| | | |
|---|---|---|
| 14,210 | Great Britain | June 12, 1914 |